United States Patent
Chou et al.

(10) Patent No.: US 6,866,632 B1
(45) Date of Patent: Mar. 15, 2005

(54) ADAPTIVE RECEIVE APERTURE FOR ULTRASOUND IMAGE RECONSTRUCTION

(75) Inventors: Ching-Hua Chou, Fremont, CA (US); Glen W. McLanghlin, Saratoga, CA (US); Larry Y. L. Mo, San Ramon, CA (US); Ting-Lan Ji, San Jose, CA (US)

(73) Assignee: Zonare Medical Systems, Inc., Mountain View, CA (US)

( * ) Notice: Subject to any disclaimer, the term of this patent is extended or adjusted under 35 U.S.C. 154(b) by 336 days.

(21) Appl. No.: 10/246,854

(22) Filed: Sep. 18, 2002

(51) Int. Cl.[7] .............................................. A61B 8/00
(52) U.S. Cl. ...................................... 600/443; 128/916
(58) Field of Search ................................ 600/437–472; 367/7, 11, 130, 138; 73/625, 626; 128/916

(56) References Cited

U.S. PATENT DOCUMENTS

| | | |
|---|---|---|
| 5,278,757 A | 1/1994 | Hoctor et al. |
| 5,740,806 A | 4/1998 | Miller |
| 5,897,501 A | 4/1999 | Wildes et al. |
| 5,902,241 A | 5/1999 | Seyed-Bolorforosh et al. |
| 6,055,861 A | 5/2000 | Banta, Jr. et al. |
| 6,089,096 A | 7/2000 | Alexandru |
| 6,174,286 B1 | 1/2001 | Ramamurthy et al. |
| 6,251,073 B1 | 6/2001 | Imran et al. |
| 6,309,356 B1 | 10/2001 | Ustuner et al. |

OTHER PUBLICATIONS

Lu, Jian–Yu, "Experimental Study of High Frame Rate Imaging with Limited Diffraction Beams," IEEE Transactions on Ultrasonics, Ferroelectrics, and Frequency Control, Jan. 1998, pp. 84–97, vol. 45, No. 1.

*Primary Examiner*—Ali Imam
(74) *Attorney, Agent, or Firm*—Carr & Ferrell LLP (57) ABSTRACT

A method for adaptively determining reconstruction signals in an ultrasound system comprises determining a size of a receive aperture, comparing the size of receive aperture at each imaging point with a predetermined number of reconstruction channels, if the size of the receive aperture is not greater than the number of reconstruction channels, processing received echo signals for the receive aperture to produce an ultrasonic image, and if the size of the receive aperture is greater than the number of reconstruction channels, preprocessing the received echo signals to produce reconstruction signals, the number of reconstruction signals being equal to the number of reconstruction channels. The reconstruction signals are further processed to produce an ultrasonic image. In one embodiment, the receive aperture is a function of location of an imaging point in a medium under investigation.

40 Claims, 5 Drawing Sheets

Near Field r = r1

FIG. 4A

Mid Field r = r2

FIG. 4B

Far Field r = r3

ADAPTIVE RECEIVE APERTURE FOR ULTRASOUND IMAGE RECONSTRUCTION

BACKGROUND OF THE INVENTION

1. Field of the Invention

This invention relates generally to ultrasound imaging systems and relates more particularly to ultrasound image reconstruction.

2. Description of the Background Art

Ultrasonic imaging is a frequently used method of analysis for examining a wide range of materials. Ultrasonic imaging is especially common in medicine because of its relatively non-invasive nature, low cost, and fast response times. Typically, ultrasonic imaging is accomplished by generating and directing ultrasonic signals into a medium under investigation using a set of ultrasound generating transducers and then observing reflections or scatterings generated at the boundaries of dissimilar materials, such as tissues within a patient, using a set of ultrasound receiving transducers. The receiving and generating transducers may be arranged in arrays and are typically different sets of transducers, but may differ only in the circuitry to which they are connected. The reflections are converted to electrical signals by the receiving transducers and then processed, using techniques known in the art, to determine the locations of echo sources. The resulting data is displayed using a display device, such as a monitor.

Typically, the ultrasonic signal transmitted into the medium under investigation is generated by applying continuous or pulsed electronic signals to an ultrasound generating transducer. The transmitted ultrasound is most commonly in the range of 1 MHz to 15 MHz. The ultrasound propagates through the medium under investigation and reflects off interfaces, such as boundaries, between adjacent tissue layers. Scattering of the ultrasonic signal is the deflection of the ultrasonic signal in random directions. Attenuation of the ultrasonic signal is the loss of ultrasonic signal as the signal travels. Reflection of the ultrasonic signal is the bouncing off of the ultrasonic signal from an object and changing its direction of travel. A reflector is an object that reflects ultrasonic signals. Transmission of the ultrasonic signal is the passing of the ultrasonic signal through a medium. As it travels, the ultrasonic energy is scattered, attenuated, reflected, and/or transmitted. The portion of the reflected or scattered signal that returns to the transducers is detected as echoes by detecting transducers. The detecting transducers convert the ultrasound echoes to electronic echo signals and, after amplification and digitization, furnishes these signals to a reconstruction unit. The reconstruction unit in turn calculates locations of echo sources. After reconstructing, the calculated positional information is used to generate two-dimensional data that can be presented as an image.

Oscillations in ultrasonic signal intensity are often called "side lobes." Side lobes occur when the ultrasonic signal's intensity oscillates as a function of position rather than falls off monotonically as a function of distance from the center of the medium under investigation. The term "apodization" refers to the process of affecting the distribution of ultrasonic signal intensity of transducer elements to reduce side lobes.

Ultrasound imaging systems typically use a transducer array having a fixed number of transducer elements. The number of transmit and/or receive channels used by the system may be less than the number of transducer elements to lower costs and increase portability. Multiplexers typically control the size and location of active transmit and receive apertures in hardware by selecting which transducer elements are coupled to the transmit and/or receive channels. For the purposes of this application, the size of an aperture is expressed as a number of active transducer elements.

Lateral resolution is the minimum separation between two point reflectors in a medium under investigation that can produce two separate echoes with an ultrasound system. Lateral resolution may be poor if the image of a point target is too wide, and two or more closely spaced reflectors are detected as a single reflector. Sensitivity is the ability of an ultrasound system to detect weak echoes. Contrast resolution is the ability of an ultrasound system to distinguish differences in strength of adjacent echoes. Improving lateral resolution, sensitivity, and contrast resolution improves the overall performance of an ultrasound system.

There are various known methodologies for improving the lateral resolution, sensitivity, and contrast resolution in an ultrasound imaging system having a limited number of transmit and/or receive channels. For example, a synthetic transmit aperture or receive aperture improves lateral resolution, sensitivity, and contrast resolution, but results in a reduced frame rate. A synthetic receive aperture can be implemented by making two or more transmit firings in the same image area (or line) and using different receive channels for each firing using multiplexer control. The receive aperture is synthesized from all of the firings to form a larger effective receive aperture. A synthetic transmit aperture or receive aperture can also be implemented by utilizing the symmetry of some scan formats, such as linear and curved linear formats. For example, the symmetry of some scan formats results in symmetric element pairs. Shorting symmetric element pairs together in hardware increases the effective aperture during transmission or reception. However, such an implementation in hardware only extracts a single line of information per firing.

Another known methodology for improving lateral resolution, sensitivity, and contrast resolution in an ultrasound imaging system with a limited number of transmit and/or receive channels is using adaptive element pitch control through various multiplexer connections. Adaptive element pitch control is implemented in hardware through multiplexer connections and includes element skipping, element shorting, and a combination of both. Adaptive element pitch selection can be changed for different operating modes, for example B-mode or color flow imaging, or for different operating frequencies. Since adaptive element pitch control is implemented in hardware, the transmit and/or receive aperture cannot be adaptively varied as a function of the depth of the imaging point.

SUMMARY OF THE INVENTION

In accordance with the present invention, a system and method are disclosed to implement an adaptive receive aperture for ultrasound image reconstruction. In one embodiment, the method of the invention includes determining a size of a desired receive aperture at each imaging point, comparing the size of the desired receive aperture with a predetermined number of reconstruction channels, if the size of the desired receive aperture is not greater than the number of reconstruction channels, processing echo signals for the desired receive aperture to produce an ultrasound image, and if the size of the desired receive aperture is greater than the number of reconstruction channels, preprocessing the echo signals for the desired receive aperture to produce reconstruction signals that are equal in number to the number of reconstruction channels, and then processing the reconstruction signals to produce an ultrasound image. The size of the desired receive aperture may be based on the line and the depth of an imaging point in a region of interest in a medium under investigation. Reconstruction channels are the processing channels of the reconstruction processor determined by the processing power and the frame rate requirement of the ultrasound system.

In one embodiment, the system of the invention includes a transducer array having a plurality of transducer elements. Each of the transducer elements is configured to receive ultrasonic signals and convert them into electronic echo signals. The system also includes a multiplexer for selectively coupling transducer elements in the transducer array, and passing the selected echo signals from the selected receive channels. A reconstruction unit is configured to receive the selected echo signals from the multiplexer. The reconstruction unit includes a receive aperture control engine configured to use the selected echo signals to adaptively determine a set of reconstruction signals. The receive aperture control engine compares the size of the receive aperture with a predetermined number of reconstruction channels at each imaging point. If the size of the receive aperture is not greater than the number of reconstruction channels, the receive aperture control engine passes all of the selected echo signals for further processing by a reconstruction processor. If the size of the receive aperture is greater than the number of reconstruction channels, the receive aperture control engine preprocesses the echo signals to produce reconstructions signals that are equal in number to the number of reconstruction channels, and outputs the reconstruction signals for further processing by the reconstruction processor.

In one embodiment, preprocessing the echo signals includes grouping qualified channels in the receive aperture by taking a weighted sum of each group. A group of qualified channels may be a pair of adjacent channels or channels with symmetry with respect to the imaging point. In one embodiment, the receive aperture control engine identifies groups of qualified channels by determining whether the phase difference between echo signals for a group of channels is less than a specified value. Preprocessing may also include skipping (ignoring) echo signals for certain channels in the receive aperture.

DETAILED DESCRIPTION OF THE INVENTION

Figure 1:
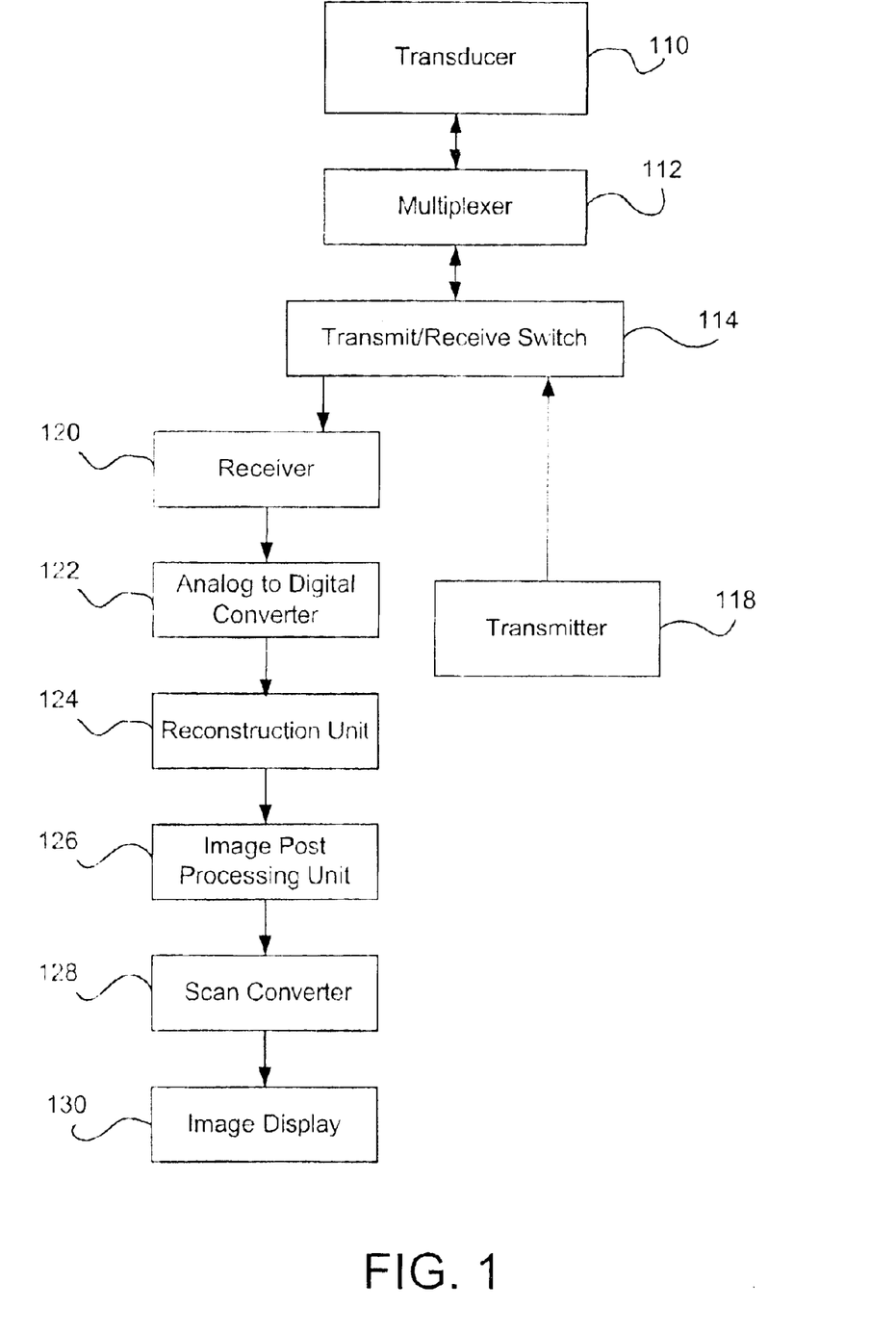
FIG. 1 is a block diagram of one embodiment for an ultrasound imaging system, in accordance with the present invention.

FIG. 1 is a block diagram of one embodiment of an ultrasound imaging system that includes, but is not limited to, a transducer 110, a multiplexer 112, a transmit/receive switch 114, a transmitter 118, a receiver 120, an analog to digital converter 122, a reconstruction unit 124, an image post processing unit 126, a scan converter 128, and an image display 130. Transducer 110 includes an array of transducer elements that may be arranged in various configurations, such as linear, sector, and curved linear. Each of the transducer elements is configured to produce and receive ultrasonic signals. Transducer 110 converts electronic signals into ultrasonic signals while transmitting, and converts received ultrasonic signals into electronic echo signals while receiving. Multiplexer 112 controls which transducer elements in transducer 110 are coupled to transmit and/or receive channels for transmitting and/or receiving ultrasonic signals. Multiplexer 112 controls the size and location of a receive aperture by coupling certain transducer elements to transmit/receive switch 114. Transmitter 118 produces electronic signals for driving transducer 110 to produce, focus or defocus, and steer an ultrasound beam. Transmit/receive switch 114 allows signals from transmitter 118 to pass to multiplexer 112, and allows echo signals from multiplexer 112 to pass to receiver 120.

Receiver 120 receives echo signals via transmit/receive switch 114 and multiplexer 112 from transducer 110, and outputs the echo signals to analog to digital converter 122. Reconstruction unit 124 processes the digital echo signals from analog to digital converter 122 to produce reconstructed in-phase (I) and quadrature (Q) signals for each imaging point that are output to image post processing unit 126. The contents and functionality of reconstruction unit 124 are further discussed below in conjunction with FIG. 2. Image post processing unit 126 processes the I and Q signals, and scan converter 128 processes the output of image post processing unit 126 to produce image data that is output to image display 130. Image post processing unit 126 and scan converter 128 may process the I and Q signals to produce, for example, B-mode (gray-scale) image data, color image data, color Doppler image data, or any other type of image data appropriate for producing an ultrasound image.

Figure 2:
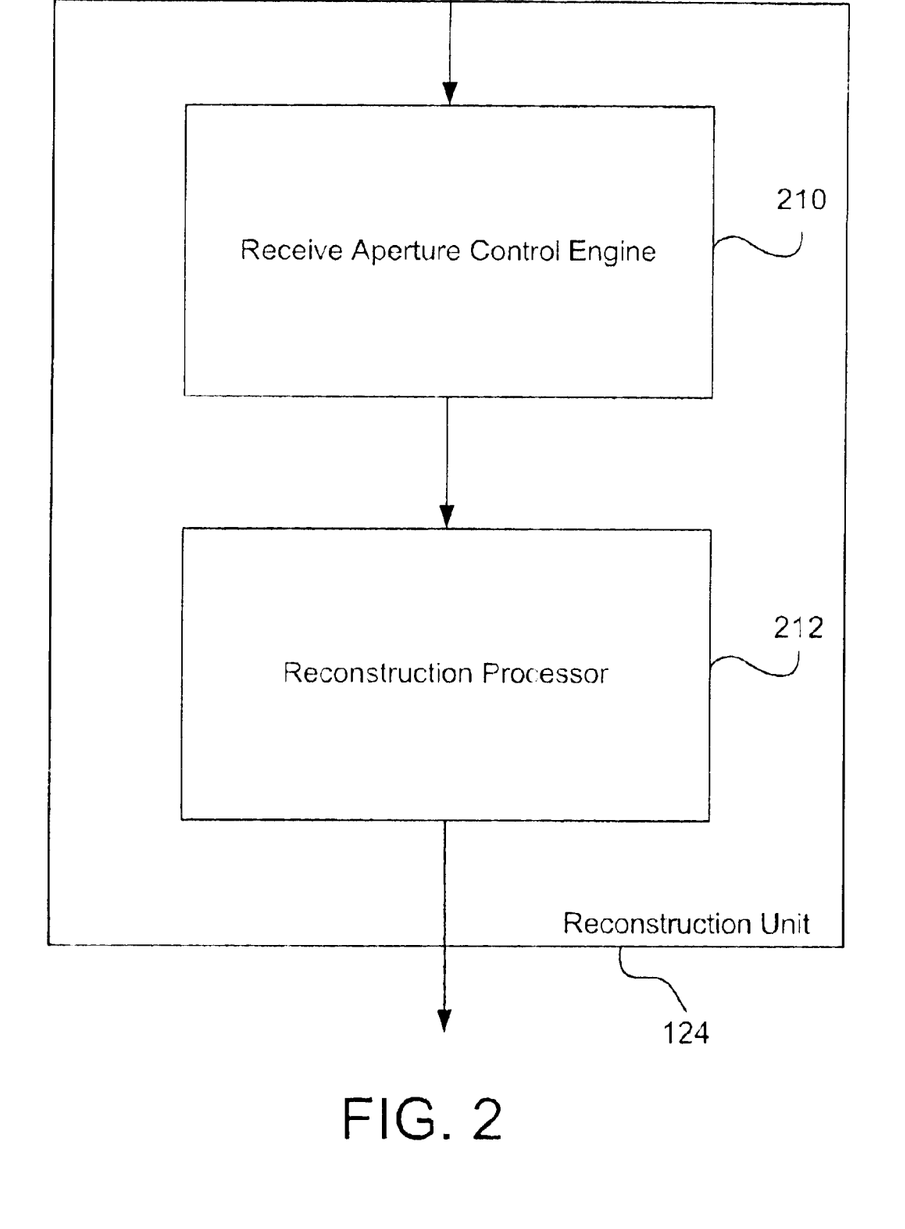
FIG. 2 is a block diagram of one embodiment of the reconstruction unit of FIG. 1, in accordance with the invention.

FIG. 2 is a block diagram of one embodiment of reconstruction unit 124 of FIG. 1, in accordance with the invention. Reconstruction unit 124 includes, but is not limited to, a receive aperture control engine 210 and a reconstruction processor 212. The input to receive aperture control engine 210 is the digitized signals from all receive channels within the receive aperture in the format of I and Q signals. Receive aperture control engine 210 adaptively determines a set of reconstruction signals and sends the reconstruction signals, and their corresponding phase alignment and apodization information, to reconstruction processor 212. The functionality of receive aperture control engine 210 is further discussed below in conjunction with FIG. 3.

Reconstruction processor 212 combines the reconstruction signals and their corresponding phase alignment and apodization information into a single digital signal at every imaging point in the format of I and Q signals. The reconstructed I and Q signals are output to image post processing unit 126 (FIG. 1).

Figure 3:
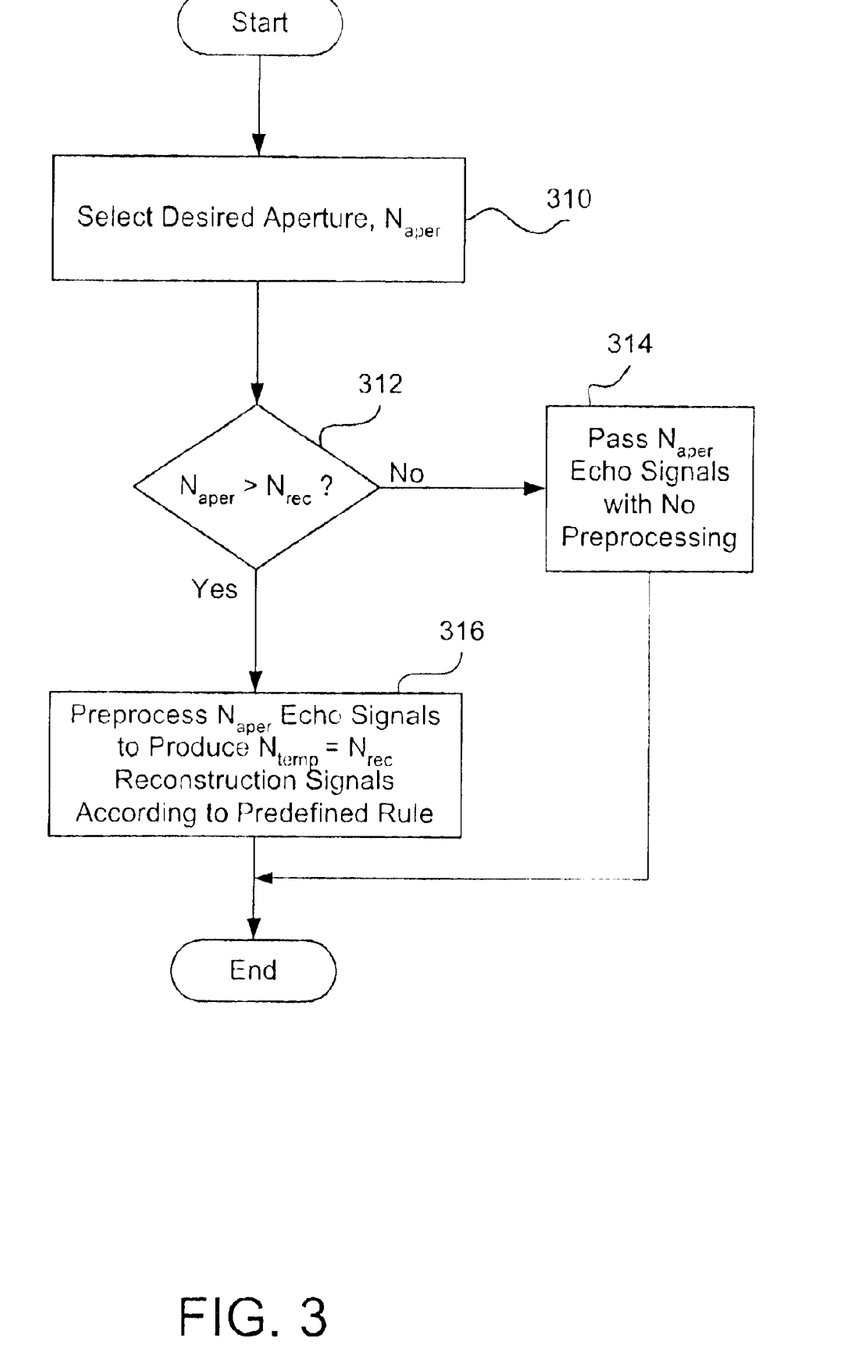
FIG. 3 is a flowchart of method steps for adaptively determining a set of reconstruction signals, in accordance with one embodiment of the invention.

FIG. 3 is a flowchart of method steps for adaptively determining a set of reconstruction signals, according to one embodiment of the invention. An ultrasound system may transmit ultrasonic signals into a medium under investigation, for example a human patient, to produce an image of a region of interest, for example the abdomen. In general, increasing the depth of an imaging point requires increasing the number of reconstruction channels, which corresponds to slower reconstruction or a need for greater computational power, and decreasing the depth of an imaging point requires decreasing the number of reconstruction channels, which corresponds to faster reconstruction or a need for lower computational power. Practically, the ultrasound system may not be able to support the number of reconstruction channels required. A number of reconstruction channels, $N_{rec}$, is set by the ultrasound system for each imaging point at a line m and a depth r. $N_{rec}$ may be set according to various criteria, for example cost and desired frame rate. $N_{rec}$ indicates a number of available reconstruction channels, but does not indicate a particular set of reconstruction channels or receive channels in the system.

In step 310, receive aperture control engine 210 selects a desired receive aperture, $N_{aper}$, which is a function of the imaging point at line m and depth r, and is expressed as a number of channels. Typically, an imaging point at a shallower depth requires a smaller receive aperture and an imaging point at a deeper depth requires a larger receive aperture for a given resolution. Then, in step 312, receive aperture control engine 210 determines whether $N_{aper}$ is greater than $N_{rec}$. If $N_{aper}$ is not greater than $N_{rec}$, then a number of reconstruction signals $N_{temp}$ is set equal to $N_{aper}$, and in step 314 receive aperture control engine 210 passes the received echo signals, and their corresponding phase alignment and apodization information, for the $N_{aper}$ channels to reconstruction processor 212 with no preprocessing. When $N_{aper}$ is not greater than $N_{rec}$, the echo signals are the reconstruction signals used by reconstruction processor 212 to produce the I and Q signals.

If $N_{aper}$ is greater than $N_{rec}$, then the method continues with step 316, where receive aperture control engine 210 preprocesses the received echo signals to produce $N_{temp}$ reconstruction signals according to a predefined rule, where the number of reconstruction signals $N_{temp}$ is set equal to $N_{rec}$. In one embodiment, the predefined rule is to group qualified channels and, if necessary, skip channels in the receive aperture such that the number of reconstruction signals ($N_{temp}$) is equal to $N_{rec}$. In one embodiment, a set of adjacent (two or more) channels is qualified if the phase difference between echo signals corresponding to the adjacent channels is smaller than a specified value (e.g., forty-five degrees). In another embodiment, a set of channels that are symmetric with respect to the imaging point is qualified because the phases of the symmetric channels are equal. In another embodiment, both qualified adjacent channels and qualified symmetric channels are grouped if they are all qualified according to the predefined rule. Receive aperture control engine 210 groups qualified channels by taking a weighted sum of the received echo signals from the channels in each group. The weights for grouped channels may be equal, or may be set based on a receive aperture apodization function. The corresponding phase alignment and apodization information of the reconstruction signal for a channel group represents the phase alignment and apodization information of that group.

If all qualified channels are grouped and the resulting number of reconstruction signals is greater than $N_{rec}$, then receive aperture control engine 210 skips selected channels in the receive aperture (i.e., ignores the echo signals on selected channels) to reduce the number of reconstruction signals to be equal to $N_{rec}$.

Figure 4A:
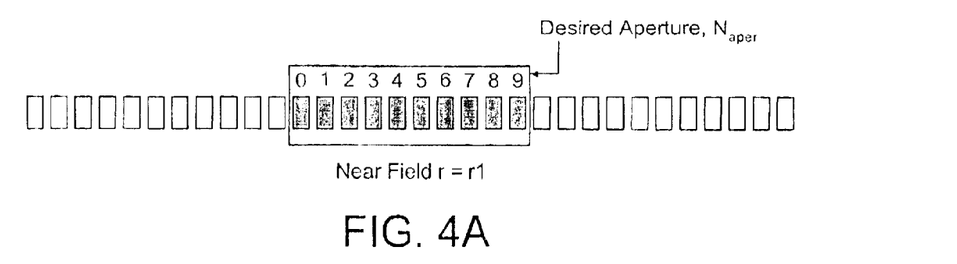
FIGS. 4A–4E illustrate determining reconstruction signals in accordance with one embodiment of the invention.
Figure 4B:
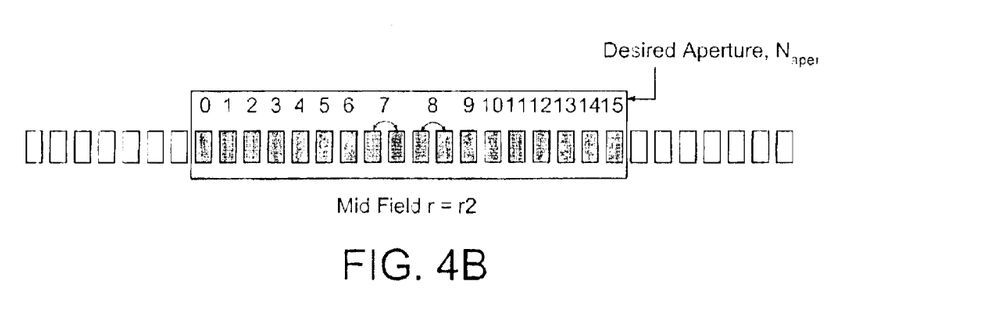
Figure 4C:
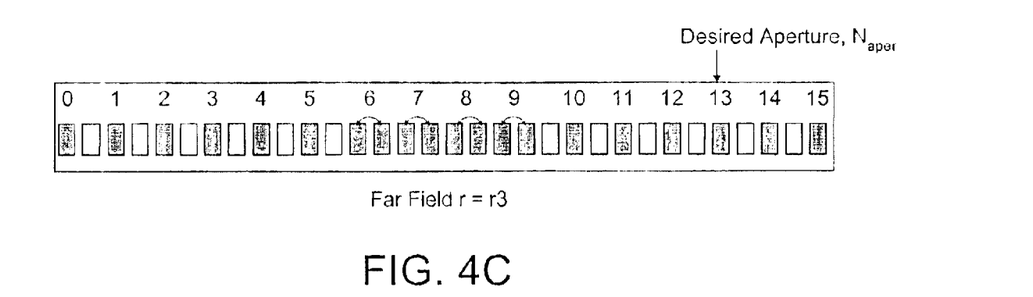
Figure 4D:
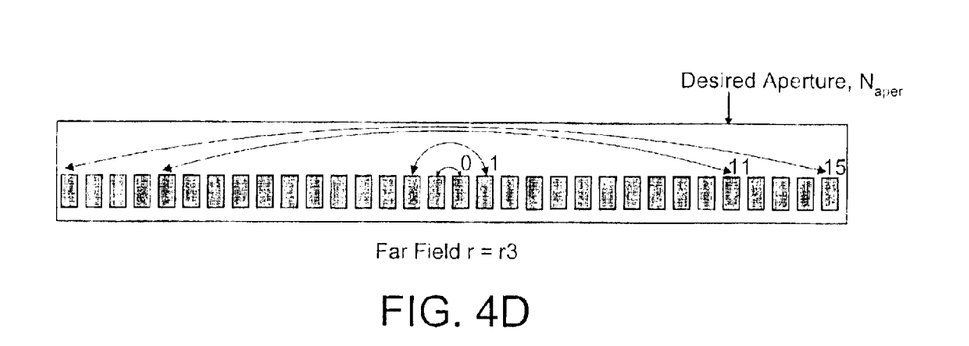
Figure 4E:
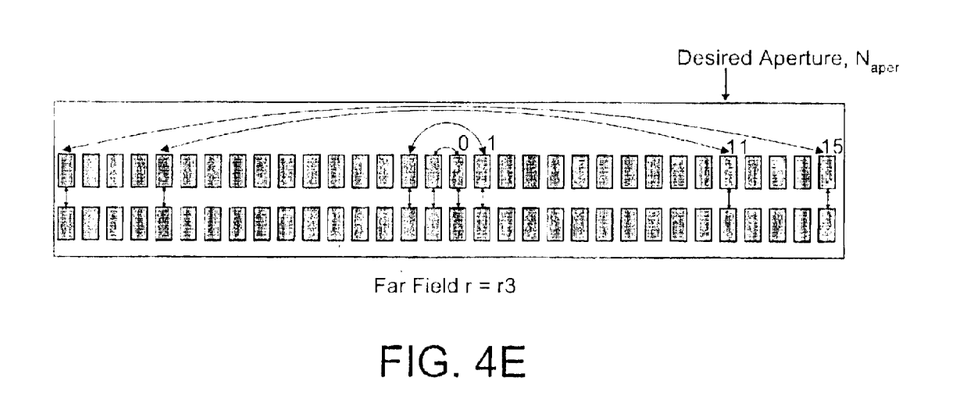

FIGS. 4A–4E illustrate selection of reconstruction signals in accordance with one embodiment of the invention. For the purpose of illustration, the maximum number of receive channels shown in FIGS. 4A–4D is thirty-two and in FIG. 4E is sixty-four, and the number of available reconstruction channels $N_{rec}$ is sixteen; however, any maximum number of receive channels and any value of $N_{rec}$ are within the scope of the invention. In FIG. 4A, the imaging point to be reconstructed is in a near field at depth r1, and the size of the desired aperture, $N_{aper}$, is ten channels. Since $N_{aper}$ is not greater than $N_{rec}$ (i.e., 10<16), the number of reconstruction signals $N_{temp}$ is set equal to $N_{aper}$, and receive aperture control engine 210 passes the received echo signals as the reconstruction signals, and their phase alignment and apodization information, for all $N_{aper}$ channels to reconstruction processor 212. The reconstruction signals and their phase alignment and apodization information are further processed by reconstruction processor 212 to produce I and Q signals of the imaging point.

In FIG. 4B, the imaging point is in a mid field at depth r2, and the desired aperture, $N_{aper}$, is eighteen channels. The imaging point is at a greater depth than that of FIG. 4A, and thus the desired aperture is larger. Since $N_{aper}$ is greater than $N_{rec}$ (i.e., 18>16), receive aperture control engine 210 sets $N_{temp}$ equal to $N_{rec}$ and preprocesses the received echo signals to produce $N_{temp}$ reconstruction signals according to the predefined rule described above in conjunction with FIG. 3. In FIG. 4B, receive aperture control engine 210 determines that there are four qualified pairs of adjacent channels, but since there are only two extra data points ($N_{aper}-N_{rec}=18-16=2$), receive aperture control engine 210 groups two pairs of channels (indicated by arrow connectors in FIG. 4B) by taking a weighted sum of the echo signals of the adjacent channels, resulting in reconstruction signals for the reconstruction channels labeled seven and eight in FIG. 4B. The corresponding phase alignment and apodization information of the reconstruction signal for a grouped pair of channels represents the phase alignment and apodization information of that pair.

In FIG. 4C, the imaging point is in a far field at depth r3, and the desired aperture, $N_{aper}$, is thirty-two channels. The imaging point is at a deeper depth than those of FIGS. 4A and 4B, and thus the desired aperture is larger. Since $N_{aper}$ is greater than $N_{rec}$ (i.e., 32>16), receive aperture control engine 210 sets $N_{temp}$ equal to $N_{rec}$ and preprocesses the received echo signals to produce $N_{temp}$ reconstruction signals according to the predefined rule described above in conjunction with FIG. 3. In the FIG. 4C embodiment, receive aperture control engine 210 determines that there are four qualified pairs of adjacent channels, and groups the four pairs of channels (indicated by arrow connectors in FIG. 4C) by taking a weighted sum of each pair of adjacent channels, resulting in reconstruction signals for the reconstruction channels labeled six through nine in FIG. 4C. The corresponding phase alignment and apodization information of the reconstruction signal for a grouped pair of channels represents the phase alignment and apodization information of that pair.

After grouping all of the available qualified pairs of adjacent channels, receive aperture control engine 210 still needs to reduce the number of channels by twelve. Since there are no remaining qualified pairs of adjacent channels, receive aperture control engine 210 discards twelve channels by skipping alternate channels from each side of the grouped channels. Receive aperture control engine 210 ignores the echo signals that correspond to the skipped channels by not passing them to reconstruction processor 212. Receive aperture control engine 210 then outputs the $N_{temp}$ reconstruction signals and their corresponding phase alignment and apodization information to reconstruction processor 212.

In FIG. 4D, the imaging point is in a far field at depth r3 as in FIG. 4C, and the desired aperture, $N_{aper}$, is thirty-two channels. In the FIG. 4D embodiment, the scan format of the ultrasound system is linear, curved linear, or any other scan format that applies symmetric delay profiles with respect to reconstruction line origin. Receive aperture control engine 210 determines that there are sixteen pairs of channels that are symmetric about the imaging point, and qualify for grouping. Receive aperture control engine 210 groups all sixteen pairs of symmetric channels (indicated by arrow connectors in FIG. 4D) by taking a weighted sum of each pair of symmetric channels, resulting in reconstruction signals for the reconstruction channels labeled zero through fifteen in FIG. 4D. After grouping, the number of reconstruction signals is equal to $N_{rec}$, so no channels need to be skipped.

In FIG. 4E, the maximum number of receive channels is sixty-four, and the receive channels are arranged as a two-dimensional array. Only two channels in the elevation direction are shown for ease of illustration; however, any number of receive channels in the elevation and any type of symmetry of transducer 110 is within the scope of the invention. The imaging point is in a far field at depth r3 and the desired aperture, $N_{aper}$, is sixty-four channels. In the FIG. 4E embodiment, the scan format of the ultrasound system is linear, curved linear, or any other scan format that applies symmetric delay profiles with respect to reconstruction line origin. Receive aperture control engine 210 determines that there are sixteen sets of four channels that are symmetric about the imaging point and qualify for grouping. Receive aperture control engine 210 groups all sixteen sets of four qualified channels (indicated by arrow connectors in FIG. 4E) by taking a weighted sum of each set of four channels, resulting in reconstruction signals for the reconstruction channels labeled zero through fifteen in FIG. 4E. After grouping, the number of reconstruction signals is equal to $N_{rec}$, so no channels need to be skipped.

Receive aperture control engine 210 determines whether to preprocess the received echo signals at each imaging point and determines how to preprocess the received echo signals at each imaging point. Channels are discarded or grouped within the desired receive aperture only when necessary. Preprocessing the received echo signals according to the invention optimizes the use of the reconstruction processing power of the ultrasonic imaging system of FIG. 1. According to the invention, the effective receive aperture can be adaptively varied as a function of the location of the imaging point. The ultrasonic imaging system is able to optimally use the limited number of reconstruction channels to provide improved lateral resolution, sensitivity, and contrast resolution at each imaging point in a region of interest in a medium under investigation.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An ultrasound system comprising:
   a transducer array including a plurality of transducer elements, each transducer element configured to receive ultrasound signals and convert the received ultrasound signals into echo signals;
   a multiplexer configured to selectively couple individual transducer elements, from the plurality of transducer elements, for passing selected echo signals; and
   a reconstruction unit configured to receive the selected echo signals from the individual transducer elements selected by the multiplexer, the reconstruction unit including a receive aperture control engine configured to use the selected echo signals to adaptively determine a set of reconstruction signals.

2. The ultrasound system of claim 1, wherein the reconstruction unit is further configured to process the set of reconstruction signals to produce in-phase and quadrature signals that are further processed by the ultrasound system to produce an ultrasound image.

3. The ultrasound system of claim 1, wherein the receive aperture control engine is further configured to adaptively determine a number of reconstruction signals by comparing a number of channels of a receive aperture with a number of reconstruction channels.

4. The ultrasound system of claim 3, wherein the number of channels of the receive aperture depends upon a location of an imaging point in a region of interest in a medium under investigation.

5. The ultrasound system of claim 3, wherein the receive aperture control engine is further configured to determine the number of reconstruction signals to be equal to the number of channels of the receive aperture if the number of channels of the receive aperture is not greater than the number of reconstruction channels.

6. The ultrasound system of claim 5, wherein the receive aperture control engine is further configured to output the selected echo signals as the set of reconstruction signals.

7. The ultrasound system of claim 3, wherein the receive aperture control engine is further configured to determine the number of reconstruction signals to be equal to the number of reconstruction channels if the number of channels of the receive aperture is greater than the number of reconstruction channels.

8. The ultrasound system of claim 7, wherein the receive aperture control engine is further configured to preprocess the selected echo signals to produce the set of reconstruction signals.

9. The ultrasound system of claim 7, wherein the receive aperture control engine, is further configured to group qualified channels in the receive aperture such that the number of reconstruction signals is not less than the number of reconstruction channels.

10. The ultrasound system of claim 9, wherein the receive aperture control engine is further configured to group qualified channels in the receive aperture by taking a weighted sum of echo signals corresponding to the qualified channels.

11. The ultrasound system of claim 10, wherein each channel in a qualified group of channels has a weight equal to a weight of the other channels in the qualified group of channels.

12. The ultrasound system of claim 10, wherein each channel in a qualified group of channels has a weight based on a receive aperture apodization function for a current image point.

13. The ultrasound system of claim 9, wherein a group of channels in the receive aperture is qualified if the group of channels is a pair of adjacent channels and a phase difference between echo signals for the channels in the pair is less than a specified value.

14. The ultrasound system of claim 9, wherein a group of channels in the receive aperture is qualified if the channels in the group are symmetric about an imaging point.

15. The ultrasound system of claim 9, wherein the receive aperture control engine is further configured to skip channels in the receive aperture such that the number of reconstruction signals equals the number of reconstruction channels.

16. The ultrasound system of claim 15, wherein the receive aperture control engine is configured to skip channels in the receive aperture by ignoring signals on the skipped channels.

17. A method comprising the steps of:
receiving ultrasound signals by a transducer array including a plurality of transducer elements;
converting the ultrasound signals into echo signals by the transducer array;
selectively coupling individual transducer elements in the transducer array for passing the selected echo signals to a reconstruction unit; and
using the selected echo signals to adaptively determine a set of reconstruction signals.

18. The method of claim 17, further comprising the step of processing the set of reconstruction signals to produce in-phase and quadrature signals that are further processed to produce an ultrasound image.

19. The method of claim 17, wherein the step of using the selected echo signals, includes comparing a number of channels of a receive aperture with a number of reconstruction channels to determine a number of reconstruction signals.

20. The method of claim 19, wherein the number of channels of the receive aperture depends upon a location of an imaging point in a region of interest in a medium under investigation.

21. The method of claim 19, wherein the step of using the selected echo signals includes determining the number of reconstruction signals to be equal the number of channels of the receive aperture if the number of channels of the receive aperture is not greater than the number of reconstruction channels.

22. The method of claim 19, wherein the step of using the selected echo signals includes determining the number of reconstruction signals to be equal to the number of reconstruction channels if the number of channels of the receive aperture is greater than the number of reconstruction channels.

23. The method of claim 22, wherein the step of using the selected echo signals further includes preprocessing the selected echo signals to produce the set of reconstruction signals.

24. The method of claim 22, further comprising the step of grouping qualified channels in the receive aperture such that the number of reconstruction data signals is not less than the number of reconstruction channels.

25. The method of claim 24, wherein the step of grouping qualified channels in the receive aperture includes taking a weighted sum of echo signals corresponding to the qualified channels.

26. The method of claim 25, wherein each channel in a group of qualified channels has a weight equal to a weight of the other channels in the group of qualified channels.

27. The method of claim 25, wherein each channel in a group of qualified channels has a weight based on a receive aperture apodization function for a current image point.

28. The method of claim 24, wherein a group of channels in the receive aperture is qualified if the group of channels is an adjacent pair of channels and a phase difference between echo signals for the channels of the pair is less than a specified value.

29. The method of claim 24, wherein a group of channels in the receive aperture is qualified if the channels in the group are symmetric about an imaging point.

30. The method of claim 24, further comprising the step of skipping channels in the receive aperture such that the number of reconstruction signals equals the number of reconstruction channels.

31. The method of claim 30, wherein the step of skipping channels in the receive aperture includes ignoring signals on the skipped channels.

32. A method for adaptively determining reconstruction signals in an ultrasound system, the method comprising the steps of:
determining a size of a receive aperture based on location of an imaging point in a medium under investigation;
receiving echo signals for the receive aperture at a reconstruction unit via a transducer array and a multiplexer;
comparing the size of the receive aperture with a predetermined number of reconstruction channels;
if the size of the receive aperture is not greater than the predetermined number of reconstruction channels, processing the echo signals for the receive aperture to produce an ultrasound image; and
if the size of the receive aperture is greater than the predetermined number of reconstruction channels, preprocessing the echo signals to produce reconstruction signals, the number of reconstruction signals being equal to the number of reconstruction channels, and processing the preprocessed reconstruction signals to produce an ultrasound image.

33. The method of claim 32, wherein the step of preprocessing the echo signals includes grouping qualified channels in the receive aperture such that the number of reconstruction signals is not less than the number of reconstruction channels.

34. The method of claim 33, wherein grouping qualified channels in the receive aperture includes taking a weighted sum of qualified channels.

35. The method of claim 33, wherein a group of channels in the receive aperture is qualified if the group of channels is an adjacent pair of channels and a phase difference between echo signals for the channels of the pair is less than a specified value.

36. The method of claim 33, wherein a group of channels in the receive aperture is qualified if the channels in the group are symmetric about an imaging point.

37. The method of claim 33, wherein the step of preprocessing the echo signals further includes skipping channels in the receive aperture such that the number of reconstruction signals is equal to the number of reconstruction channels.

38. The method of claim 37, wherein skipping channels in the receive aperture includes ignoring received signals on selected channels in the receive aperture.

39. A system for adaptively determining reconstruction signals, comprising:
size determining means configured to determine a size of a receive aperture based on location of an imaging point in a medium under investigation;
echo signal receiving means configured to receive echo signals for the receive aperture;
size comparing means configured to compare the size of the receive aperture with a predetermined number of reconstruction channels;
echo signal processing means configured to process the echo signals for the receive aperture to produce an ultrasound image if the size of the receive aperture is not greater than the predetermined number of reconstruction channels; and
echo signal preprocessing means configured to preprocess the echo signals to produce reconstruction signals, the number of reconstruction signals being equal to the number of reconstruction channels, if the size of the receive aperture is greater than the predetermined number of reconstruction channels, the echo signal processing means further configured to process the reconstruction signals to produce an ultrasound image.

40. A computer-readable medium comprising program instructions for adaptively determining reconstruction signals by performing the steps of:

determining a size of a receive aperture based on location of an imaging point in a medium under investigation;

receiving echo signals for the receive aperture at a reconstruction unit via a transducer array and a multiplexer;

comparing the size of the receive aperture with a predetermined number of reconstruction channels;

if the size of the receive aperture is not greater than the predetermined number of reconstruction channels, processing the echo signals for the receive aperture to produce an ultrasound image; and     if the size of the receive aperture is greater than the predetermined number of reconstruction channels, pre-processing the echo signals to produce reconstruction signals, the number of reconstruction signals being equal to the number of reconstruction channels, and processing the reconstruction signals to produce an ultrasound image.

* * * * *

UNITED STATES PATENT AND TRADEMARK OFFICE
CERTIFICATE OF CORRECTION

PATENT NO.     : 6,866,632 B1
DATED          : March 15, 2005
INVENTOR(S)    : Chou et al.

It is certified that error appears in the above-identified patent and that said Letters Patent is hereby corrected as shown below:

Title page,
Item [75], Inventors, "Glen W. McLanghlin, Saratoga, CA" should read -- Glen W. McLaughlin, Saratoga, CA --.

Signed and Sealed this

Twenty-seventh Day of September, 2005

JON W. DUDAS
*Director of the United States Patent and Trademark Office*